Figure 1:
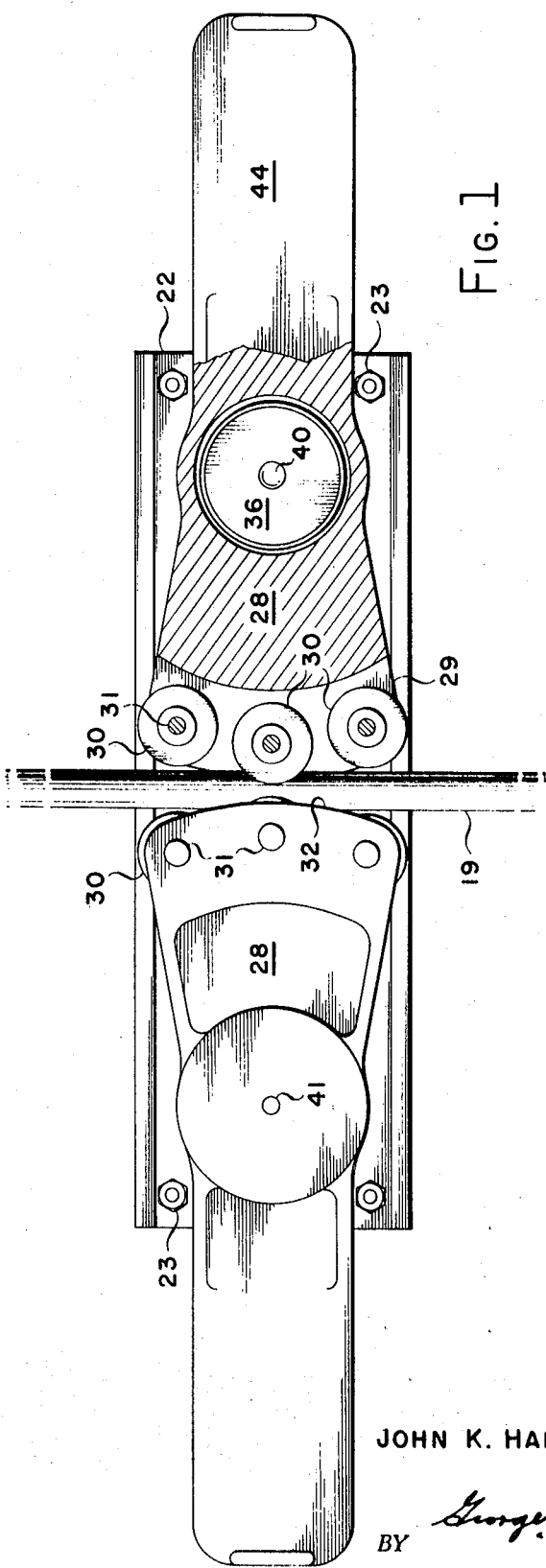

United States Patent

[11] 3,618,899

[72] Inventor John K. Hancock, Jr.
 Atlanta, Ga.
[21] Appl. No. 42,208
[22] Filed June 1, 1970
[45] Patented Nov. 9, 1971
[73] Assignee Lockheed Aircraft Corporation
 Burbank, Calif.

[54] CABLE GUIDE
 5 Claims, 4 Drawing Figs.
[52] U.S. Cl. .................................................. 254/190,
 193/35, 198/1
[51] Int. Cl. ...................................................... B66d 1/36
[50] Field of Search ........................................... 254/190,
 191; 24/115 E, 115 F

[56] References Cited
UNITED STATES PATENTS
447,199 2/1891 Paul ............................ 254/190

527,531 10/1894 Louden ..................... 254/190

*Primary Examiner*—Evon C. Blunk
*Assistant Examiner*—H. S. Lane
*Attorneys*—John J. Sullivan and George C. Sullivan

ABSTRACT: This cable guide when employed in multiples provides means for controlling the direction of movement of cargo-laden pallets, especially when coupled together to form a "train." The pallets are motivated by a pulling force on a flexible cable connected to the lead pallet. With the guides mounted to the floor beneath the surface over which the pallets ride, the cable tension angle increases as the lead pallet approaches. Just prior to the lead pallet reaching the guide, the spring-loaded halves which comprise the guide open up to release the cable. The halves are then automatically repositioned by their springs allowing the pallets to pass over the guide. The location of subsequent guides determines the direction of the pallet train and if arranged in a straight line the trains will not wander.

PATENTED NOV 9 1971

3,618,899

SHEET 1 OF 2

JOHN K. HANCOCK, JR.
*INVENTOR.*

BY George C Sullivan
   Agent

John J. Sullivan
Attorney

JOHN K. HANCOCK, JR.
INVENTOR.

BY George C Sullivan
Agent

John J. Sullivan
Attorney

CABLE GUIDE

This invention relates to cable guides and more particularly to the type of cable guides as are customarily employed to maintain and control the direction of towing cables especially those which are adapted to payout from and windup on a reel or winch and which offer particular utility in the movement of relatively heavy loads on and off board vehicles.

While the present invention was primarily designed and adapted for use in connection with aircraft in the loading and unloading of cargo such as pallets, containers and the like, it has general utility and application wherever tow cables are used. By way of example, however, in the cargo aircraft application, present day loading and unloading techniques require that palletized or containerized loads be quickly moved on and off board the aircraft to minimize the turnaround time for the payload carrying aircraft. To facilitate this, the containers or pallets are often connected in train formation and rollers or equivalent antifriction means are mounted in the floor of the aircraft, loading dock, ramp, etc., to facilitate such cargo movement. Because of the size of such trains, power means often in the form of a winch is employed to drive or pull the loads on and off the aircraft. Where especially long distances are involved in this movement, as for example with the larger present day aircraft having relatively lengthy holds or cargo compartments, complications arise in the manipulation of such cargo, particularly cargo trains.

It has, therefore, become desirable to maintain the tow cables in a preselected, out-of-the-way position by means of and through guides at spaced intervals in the length thereof from the power drive or winch to the connected pallet or container. These guides are intended to serve the dual purpose of controlling the direction of movement of the pallets by preventing them from wandering relative to the selected path and maintaining the tow cables which connect the power for their movement in an unobstructing and noninterfering location. Special provisions must be made to facilitate the release of the tow cable by these guides one after another as the pallets pass. At the same time, such guides are required to impose minimum frictional wear on the tow cable.

The instant invention proposes to satisfy the foregoing requirements and to improve the cargo-loading and unloading operation by the provision of a tow cable guide which incorporates pulleys or rollers for contact with the cable. These rollers are especially designed and constructed to facilitate the threading of the cable thereon and to assure its being maintained in contact therewith. Also, it is contemplated that each of these roller guides includes an automatic release mechanism whereby the cable is instantaneously removed from the guide as the load approaches in order to eliminate a requirement for the manual separation thereof. At the same time, once the cable is released, the guide is forced to an out-of-the-way position so that the load can pass over it up to the location of the next guide, the winch, or its ultimate position.

More specifically, each of the guides as herein proposed comprises, in essence, a pair of adjacent rollers in spaced relation one to the other whereby the adjacent surfaces coact to define a passage for a towing cable. Each of these rollers is pivotally secured to the floor, dock or other supporting surface and constantly biased to its cable-engaging position. At their remote ends, however, each of these cable guides includes means facilitating the movement of the rollers out of their normal position and causing them to separate and allow the removal and/or insertion of the tow cable therein.

When the cable is thus made to pass through each of the guides and ultimately attached to the load, as the load approaches the guide the angle of the cable increases producing an upward force on and against the rollers which act in opposition to their bias whereby the cable is automatically released therefrom. Upon this release, the rollers are allowed to return instantly to their normal out-of-the-way position where the load can pass freely over them.

Figure 2:
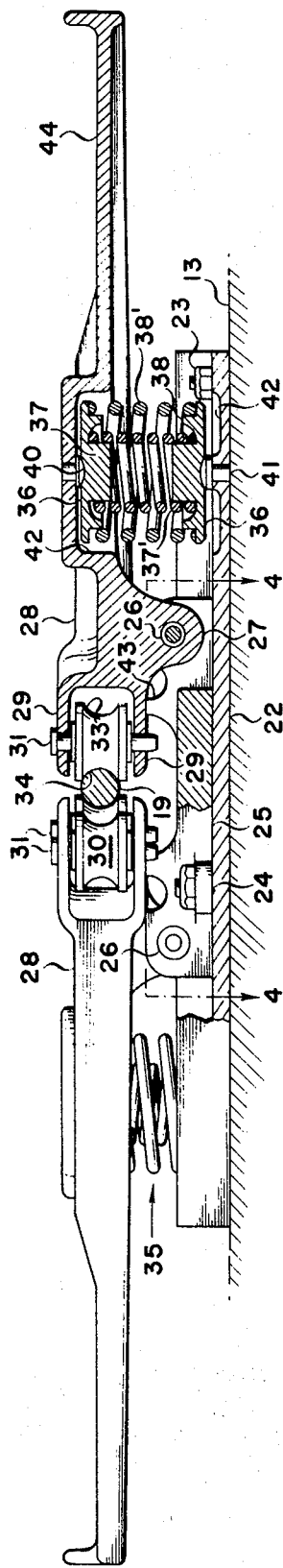
Figure 3:
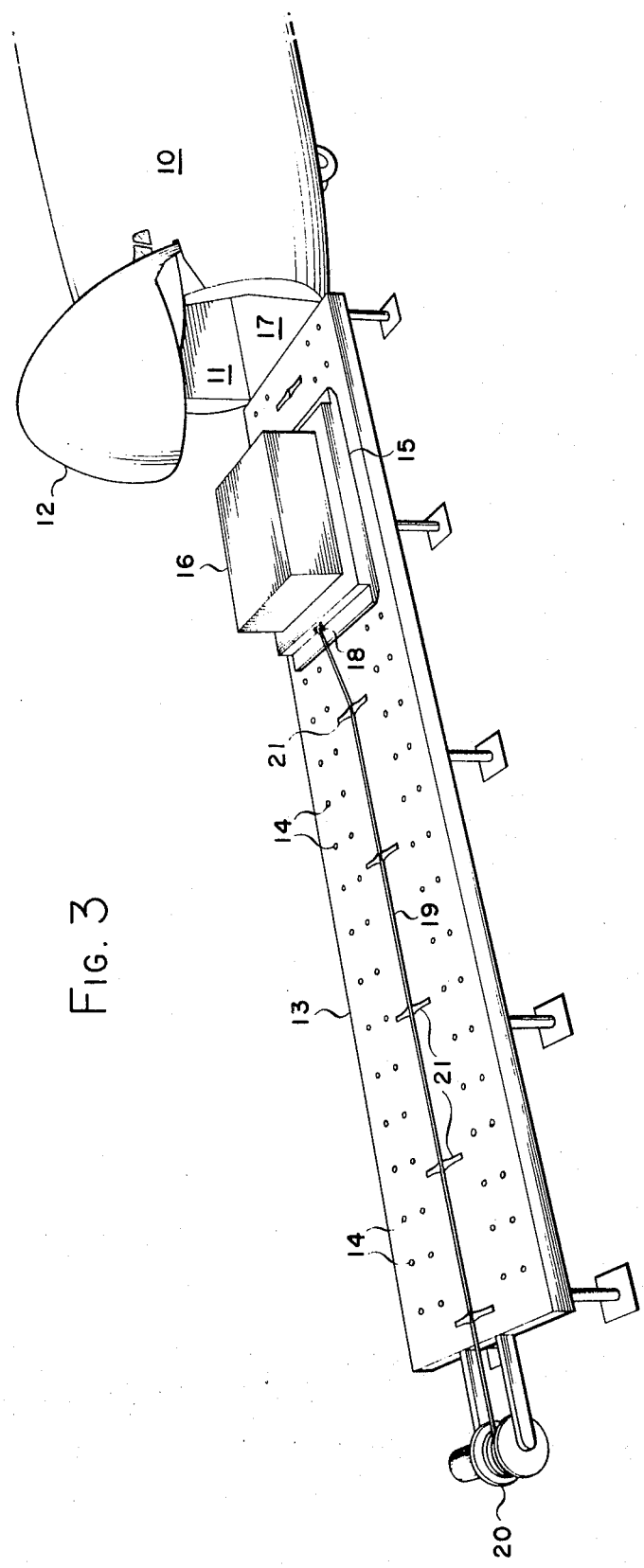
Figure 4:
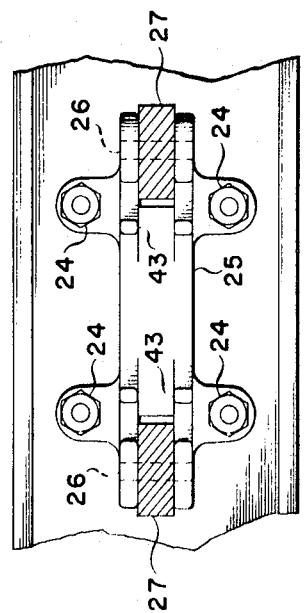

With the above and other objects in view as will be apparent, this invention consists in the construction, combination and arrangement of parts all as hereinafter more fully described, claimed and illustrated in the accompanying drawings, wherein:

FIG. 1 is a plan elevation of one of the cable guides designed and constructed following the teachings of this invention to show primarily the normal position of its adjacent roller assemblies which define and control the path of the associated cable, only the portion of the cable that is engaged by the guide being illustrated and part of one of the roller assemblies being broken away to reveal the structure thereof and its engagement with the cable;

FIG. 2 is a side view of the cable guide shown in FIG. 1 with substantially one longitudinal half broken away to reveal the construction and mounting of each pair of roller assemblies that constitutes the guide shown in its normal or biased position;

FIG. 3 is a view of the guide shown in FIGS. 1 and 2 as employed in multiples and installed in a typical application, e.g. mounted on a dock over which cargo is to be moved in being unloaded from an aircraft to show how each guide serves to control such cargo in its movement over the dock surface during the reeling in of the towing cable appropriately connected at its remote end to a power device or winch; and FIG. 4 is a section taken along line 4—4 of FIG. 2 to show more specifically the details of the mounting for the coacting roller assemblies.

Referring more particularly to the drawings, 10 designates an end portion of a cargo aircraft having a storage compartment or hold 11 therein and a movable end closure or door 12 therefor. In order to facilitate on and off-loading of the aircraft 10, a dock 13 is generally employed. Typical of such docks 13, the upper surface thereof is provided with rollers 14 or equivalent antifriction elements which extend above the upper surface of the dock 13 and thereby establish multiple points or relatively small areas of contact for a container or pallet 15 in or on which cargo 16 is carried. With the deck or floor 17 of the hold 11 in abutment against the dock 13 and the surfaces thereof in substantial alignment, load-carrying pallets 15 are readily moved into and out of the hold 11. For this purpose a tow hitch 18 is provided on each end of the pallet 15 adapted to connect a cable 19 wound on and extending from a winch 20. Such a winch 20 is appropriately mounted in a fixed position with respect to the dock 13 for cargo-unloading operations and a similar winch (not shown) within the aircraft 10 for cargo-loading operations.

The cable guide herein proposed is generally indicated as 21 in FIG. 3, being intended to be mounted to the upper surface of the dock 13 in multiples each spaced one from the other to establish and maintain the path of the cable 19 from the winch 20 to the pallet 15. Each such guide 21 has a relatively low profile when thus installed and assembled so that the uppermost parts thereof are normally disposed in a plane below that of the rollers 14 for reasons to become more apparent.

More specifically, each of these cable guides 21 includes a base plate 22 removably secured or anchored as at 23 to the dock 13. Mounted, as at 24, on the plate 22, is an upstanding support 25 which includes at each of its opposite ends a pair of spaced arms constituting a clevis for the pivotal attachment, as at 26, of an ear 27 depending from a lever 28. Each of these levers 28 is thereby pivotally mounted on the plate 22 in end-to-end alignment with the other. Thus disposed, the levers 28 terminate at their adjacent ends in a pair of spaced arms 29 which open toward each other.

Located between each pair of arms 29 is a plurality of rollers or pulleys 30 each individually mounted on an appropriate pin 31 so that all of the rollers 30 are capable of free and unrestricted rotation. Preferably there are three rollers 30 thus carried by each lever 28 and the outer edges of each pair of arms 29 are arcuate as at 32 with the pins 31 all equidistant therefrom. The center rollers 30 of each lever 28 are thereby disposed closer to one another than are the outer corresponding rollers 30 when the levers 28 are disposed in longitudinal alignment.

The rollers 30 are each peripherally grooved as at 33 and when the levers 28 are disposed in end-to-end alignment with their arms 29 adjacent each other the grooves 33 of corresponding rollers 30 define a generally circular passage 34 adapted to accommodate the tow cable 19. The cable 19 is thereby held and maintained against both vertical and lateral movement with respect to the levers 28 while virtually unrestricted with respect to linear movement.

In order to maintain the rollers 30 in this position, i.e., the operative position, the levers 28 are biased by appropriate means such as a compression spring assembly 35 associated with the respective levers 28 on the remote sides of their pivots 26 with respect to the rollers 28. To this end, each spring assembly 35 comprises a pair of identical discs or buttons 36 each formed with a central lateral stud protection 37 and an annular lateral projection 38. These projections 37 and 38 on each button 36 are adapted to face one another and mount inner and outer springs 37' and 38' respectively which maintain the buttons 36 in spaced alignment. The outer surface of each button 36 is centrally recessed or dimpled as at 40 with a defining surface that corresponds to the external surfaces of a respective post 41 carried by and projecting from the plate 22 and associated lever 28.

The facing portions of each lever 28 and the price 22 adjacent the several posts 41 are recessed or dished out to form a cup 42 to accommodate the associated spring assembly 35. The respective posts 41 extend from the base wall of each of these cups 42 to thereby serve to retain the spring assembly 35 in position. At the same time, each spring assembly 35 is capable of limited universal movement or teetering. This spring assembly 35 is designed and intended to provide the necessary force to normally maintain the associated lever 28 in the operative position while at the same time permitting a minimum profile condition. Thus, the levers 28 are normally biased to maintain their rollers 30 in the operative position, the extension of the spring assemblies 35 to move the levers 28 beyond this position being resisted by an abutment 43 formed or otherwise provided on the support 25 adjacent each pair of arms 29. Extending outwardly from the location of the spring assemblies 35 each lever 28 is formed with an extension 44 which constitutes, in effect, a handle to facilitate the rotation thereof against the action of its spring assembly 35. When the cable guide 21 is mounted on the floor, deck or similar surface, an operator may merely step on each of the outer extensions 44 of the levers 28. The rollers 28 are thereby rotated in an upward direction and away from each other to enlarge and open the passage 34 defined thereby to permit the insertion and/or removal of the cable 19.

Moreover, upon operation of the winch 20 and the winding up of the cable 19 the connected pallet 15 is forcibly moved or pulled toward the winch 20. As the pallet approaches the first guide 21, the angle of the cable 19 relative to the dock 13 increases to a point where a sufficient component of force is applied in a vertical direction to lift the adjacent ends 29 of the levers 28 and ultimately release the cable 19 from engagement between the coacting rollers 30. When this occurs, the levers 28 are instantaneously forced to their original, operative position under the normal action of their spring assemblies 35 where they are below the plane of the pallet undersurface so as not to interfere with the continued movement thereof toward the winch 20. Thus, each guide 21 is caused to successfully operate until the pallet 15 reaches its ultimate position on the dock 13.

What is claimed is:

1. A tow cable guide comprising:
   a pair of levers disposed in longitudinal alignment to each other and each mounted medially of its length on a supporting structure by a pivotal connection;
   at least one roller carried by the respective levers at their adjacent ends, each said roller being mounted for free and unrestricted rotation about an axis perpendicular to its lever and having a peripheral, arcuate surface whereby the rollers of both levers coact with each other when said levers are disposed in end-to-end alignment to define a generally circular channel having a transverse dimension substantially equal to that of a cable adapted to pass therethrough; and
   biasing means of predetermined force operative on each said lever to maintain it in end-to-end alignment as aforesaid, said predetermined force being less than that capable of application by relative lateral movement of said cable.

2. The cable guide of claim 1 including a baseplate mounting said levers and in turn adapted to be removably mounted to said supporting structure.

3. The cable guide of claim 1 wherein each said lever terminates in an arcuate edge at the adjacent ends aforesaid and carries three rollers the axis of each of which is equidistant from said edge whereby the corresponding center rollers of each lever define the generally circular channel aforesaid.

4. The cable guide of claim 1 wherein said biasing means is a compression spring mounted between said supporting structure and each said lever outwardly of said pivotal connection and a fixed stop inwardly of said pivotal connection to limit the pivotal movement of said lever under the action of said spring.

5. The cable guide of claim 4 wherein said compression spring constitutes an assembly comprising a pair of identical discs separated by a pair of coaxial springs, each said disc including adjacent studs to engage and secure said springs and central recesses defined by surfaces complemental to respective pins whereby said assembly is capable of limited substantially universal movement.

* * * * *